(12) United States Patent
Cohrs et al.

(10) Patent No.: US 12,269,441 B2
(45) Date of Patent: Apr. 8, 2025

(54) CLEANING DEVICE, CLEANING AND SENSOR SYSTEM FOR A VEHICLE, AND VEHICLE, AND METHOD FOR CLEANING A SURFACE OF A SENSOR

(71) Applicant: ZF CV Systems Global GmbH, Bern (CH)

(72) Inventors: Jan Cohrs, Wietzendorf (DE); Janik Ricke, Uetze (DE)

(73) Assignee: ZF CV Systems Global GmbH, Bern (CH)

( * ) Notice: Subject to any disclaimer, the term of this patent is extended or adjusted under 35 U.S.C. 154(b) by 12 days.

(21) Appl. No.: 18/315,086

(22) Filed: May 10, 2023

(65) Prior Publication Data
US 2023/0278530 A1    Sep. 7, 2023

Related U.S. Application Data

(63) Continuation of application No. PCT/EP2021/083931, filed on Dec. 2, 2021.

(30) Foreign Application Priority Data

Dec. 18, 2020    (DE) .................. 10 2020 134 282.9

(51) Int. Cl.
*B60S 1/56*    (2006.01)
*B05B 3/14*    (2006.01)
(Continued)

(52) U.S. Cl.
CPC ....... *B60S 1/56* (2013.01); *B05B 3/14* (2013.01); *B05B 12/02* (2013.01); *B60S 1/481* (2013.01); *B60S 1/52* (2013.01); *B60S 1/54* (2013.01)

(58) Field of Classification Search
CPC ...... B60S 1/56; B60S 1/481; B60S 1/52; B60S 1/54; B60S 1/528; B60S 1/544;
(Continued)

(56) References Cited

U.S. PATENT DOCUMENTS

| 4,955,543 A | 9/1990 | Orth et al. |
|---|---|---|
| 10,259,431 B1 | 4/2019 | Ybarra et al. |

(Continued)

FOREIGN PATENT DOCUMENTS

| DE | 38 28 999 A1 | 3/1990 |
|---|---|---|
| DE | 195 17 761 A1 | 11/1996 |

(Continued)

OTHER PUBLICATIONS

Machine translation of DE-102014213282-A1 (Year: 2016).*
(Continued)

*Primary Examiner* — Erin F Bergner
(74) *Attorney, Agent, or Firm* — Walter Ottesen, P.A.

(57) ABSTRACT

A cleaning device is for a vehicle. The cleaning device has at least one cleaning nozzle configured to apply a cleaning fluid to a surface to be cleaned of at least one sensor, a fluid supply unit, in particular a fluid valve or a pump, configured to selectively provide the cleaning fluid to the cleaning nozzle, and an actuator for generating a cleaning movement of the cleaning nozzle. It is provided in the cleaning device that the cleaning device has a switching unit for controlling the actuator, such that the cleaning movement can be generated independently of the fluid supply unit.

16 Claims, 6 Drawing Sheets

(51) Int. Cl.
  *B05B 12/02* (2006.01)
  *B60S 1/48* (2006.01)
  *B60S 1/52* (2006.01)
  *B60S 1/54* (2006.01)

(58) Field of Classification Search
  CPC .. B05B 3/14; B05B 12/02; B08B 3/02; B08B 5/02; G02B 27/0006
  See application file for complete search history.

(56) References Cited

U.S. PATENT DOCUMENTS

| | | | |
|---|---|---|---|
| 2002/0060254 A1 | 5/2002 | Bandemer et al. | |
| 2016/0311405 A1* | 10/2016 | Richardson | B60S 1/60 |
| 2018/0015907 A1* | 1/2018 | Rice | B60S 1/52 |
| 2018/0201229 A1* | 7/2018 | Singer | B60S 1/3409 |
| 2019/0248338 A1 | 8/2019 | Singer | |
| 2019/0381975 A1 | 12/2019 | Caillot et al. | |
| 2020/0108801 A1 | 4/2020 | Frederick et al. | |
| 2020/0114880 A1 | 4/2020 | Hahn | |
| 2020/0180563 A1 | 6/2020 | Gilbertson | |
| 2020/0298283 A1 | 9/2020 | Saito et al. | |
| 2020/0355808 A1 | 11/2020 | Albuquerque et al. | |
| 2020/0362981 A1 | 11/2020 | Grether et al. | |
| 2021/0237693 A1* | 8/2021 | Yamauchi | B08B 3/02 |
| 2021/0387598 A1 | 12/2021 | Trebouet | |

FOREIGN PATENT DOCUMENTS

| | | | |
|---|---|---|---|
| DE | 196 46 972 A1 | 5/1998 | |
| DE | 199 20 470 A1 | 11/1999 | |
| DE | 100 48 033 A1 | 5/2002 | |
| DE | 102014213282 A1 * | 1/2016 | ............ B60S 1/0848 |
| DE | 10 2015 118 670 A1 | 5/2017 | |
| DE | 10 2017 221 530 A1 | 6/2019 | |
| DE | 10 2018 132 758 A1 | 6/2019 | |
| DE | 11 2018 004 171 T5 | 5/2020 | |
| WO | 2019/029804 A1 | 2/2019 | |
| WO | 2020/064881 A1 | 4/2020 | |

OTHER PUBLICATIONS

English translation and International Preliminary Report on Patentability of the International Bureau of WIPO dated Jun. 13, 2023 for international application PCT/EP2021/083931 on which this application is based.

English translation and Written Opinion of the International Searching Authority dated Mar. 29, 2022 for international application PCT/EP2021/083931 on which this application is based.

International Search Report of the European Patent Office dated Mar. 29, 2022 for international application PCT/EP2021/083931 on which this application is based.

* cited by examiner

CLEANING DEVICE, CLEANING AND SENSOR SYSTEM FOR A VEHICLE, AND VEHICLE, AND METHOD FOR CLEANING A SURFACE OF A SENSOR

CROSS-REFERENCE TO RELATED APPLICATIONS

This application is a continuation application of international patent application PCT/EP2021/083931, filed Dec. 2, 2021, designating the United States and claiming priority from German application 10 2020 134 282.9, filed Dec. 18, 2020, and the entire content of both applications is incorporated herein by reference.

TECHNICAL FIELD

The disclosure relates to a cleaning device. The disclosure relates further to a corresponding cleaning and sensor system and to a vehicle, and also to a method for cleaning a surface, which is to be cleaned, of a sensor.

BACKGROUND

Cleaning and sensor systems having a cleaning device for cleaning a surface to be cleaned of a sensor, in particular in a vehicle, are known per se.

Thus, a cleaning and sensor system mentioned at the beginning has a cleaning device for a sensor, in particular of a vehicle. The cleaning device conventionally has:
  a cleaning nozzle configured to apply a cleaning fluid to a surface to be cleaned of the at least one sensor,
  a fluid supply unit, in particular a fluid valve or a pump, configured to selectively provide the cleaning fluid to the cleaning nozzle,
  an actuator for generating a cleaning movement of the cleaning nozzle.

Such cleaning devices advantageously allow soiling that occurs during operation of a vehicle to be cleaned from the sensors and thus ensure reliable functioning of the sensors, for example cameras or LIDAR sensors.

Generally, there is a target size conflict in the arrangement of a cleaning nozzle in relation to, that is, relative to, the surface to be cleaned of the sensor. On the one hand, the structure is to be as compact and inconspicuous as possible, but on the other hand an advantageous angle of impact, in particular an angle of impact that is as perpendicular as possible, of the cleaning fluid on the surface to be cleaned is desirable in order to generate a high cleaning capacity.

In this respect, solutions for cleaning devices having deployable nozzles already exist in the field of automotive headlamps. Thus, DE 3828999 A1 describes a headlamp washing system for motor vehicles having a pressure generating device for conveying the cleaning fluid, a valve and a nozzle which can be deployed by a nozzle carrier from a retracted rest position into a working position, wherein the valve is opened only when the nozzle carrier is in the deployed position.

Comparable cleaning devices are also described in DE 19517761 A1 and DE 19920470 A1.

The effective cleaning of sensors having a relatively large surface or the cleaning of multiple sensors, for example accommodated in a housing, via a cleaning device continues to be a problem. Efficient cleaning in the sense of a mode of functioning of the cleaning device that saves cleaning fluid, in particular cleaning liquid, continues to be a problem.

It is therefore desirable to improve the functioning of a cleaning device in respect of at least one of the mentioned problems.

SUMMARY

It is an object of the disclosure to provide an improved device and method, which is improved in respect of at least one of the mentioned problems.

In particular, effective cleaning of sensors having a relatively large surface or of multiple sensors and/or efficient cleaning in the sense of a mode of functioning that saves cleaning fluid is to be made possible in an improved manner.

The object is achieved via a cleaning device for a sensor according to the disclosure. The cleaning device, for example, includes: a cleaning nozzle configured to apply a cleaning fluid to a surface to be cleaned of the sensor; a fluid supply unit configured to selectively provide the cleaning fluid to the cleaning nozzle; an actuator configured to generate a cleaning movement of the cleaning nozzle; and, a switching unit configured to control the actuator such that the cleaning movement can be generated independently of the fluid supply unit.

The object, as far as the device is concerned, is, for example, achieved by the disclosure also with a cleaning and sensor system for a vehicle including: a sensor; a cleaning device having a cleaning nozzle, a fluid supply unit, an actuator, and a switching unit; the cleaning nozzle being configured to apply a cleaning fluid to a surface to be cleaned of the sensor; a fluid supply unit configured to selectively provide the cleaning fluid to the cleaning nozzle; the actuator being configured to generate a cleaning movement of the cleaning nozzle; the switching unit being configured to control the actuator such that the cleaning movement can be generated independently of the fluid supply unit; a supply device; and, a controller configured to control the cleaning device.

The cleaning and sensor system for a vehicle has a sensor and a cleaning device according to the disclosure and a supply device and a control unit which is configured to control the cleaning device. The supply device can have, for example, a compressed air source and/or a tank.

The object, as far as the method is concerned, is also achieved via a method for cleaning a surface to be cleaned of a sensor according to the disclosure. The method, for example, includes: generating a cleaning movement of a cleaning nozzle and applying a cleaning fluid to the surface to be cleaned during the cleaning movement; generating a retraction movement in an opposite direction to the cleaning movement, and applying a further cleaning fluid to the surface to be cleaned during the retraction movement.

The disclosure proceeds from the finding that an actuator for generating a cleaning movement of a cleaning nozzle is advantageous. For the cleaning of sensors, in particular of a sensor having a relatively large surface and/or of an arrangement of multiple sensors, the disclosure has recognized that a cleaning nozzle so movable via an actuator is advantageous for effectively cleaning a relatively large surface to be cleaned and/or an arrangement of multiple sensors, in particular in a way that saves cleaning fluid.

This is advantageously achieved by a switching unit for controlling the actuator. Via a switching unit and a fluid supply unit that is controllable independently thereof, the cleaning fluid can advantageously be provided independently of the cleaning movement. As a result, the cleaning nozzle, and with it in particular a jet of cleaning fluid, can be moved over a surface to be cleaned of a sensor, advantageously while the cleaning fluid is being applied to the surface to be cleaned. Application of a cleaning fluid can take place independently of the cleaning movement.

Within the scope of an advantageous development, it is provided that the cleaning device has a first fluid supply unit for a first cleaning fluid and a second fluid supply unit for a second cleaning fluid. In particular, the first cleaning fluid is compressed air and the second cleaning fluid is a cleaning liquid. Via a first fluid supply unit and a second fluid supply unit, two cleaning fluids can advantageously be provided independently of one another to a cleaning nozzle. In this manner, improved cleaning of the surface to be cleaned is possible. For example, in a cleaning method, cleaning liquid as the second cleaning fluid can first be applied to the surface to be cleaned, so that dirt particles can be submitted, and then compressed air as the first cleaning fluid can be applied to the surface to be cleaned in order to remove the softened dirt particles.

Within the scope of an advantageous development, it is provided that the cleaning fluid, in particular the first cleaning fluid, is compressed air, and in particular the fluid supply unit is a 2/2-way valve. In particular, the fluidic pressure cylinder is a pneumatic pressure cylinder. The 2/2-way valve is advantageously formed as a 2/2-way solenoid valve. The 2/2-way valve is in particular configured to be normally closed, that is, in a blocking position in a non-activated, in particular non-energized, state. Within the scope of the disclosure, a 2/2-way valve can be configured as a pneumatic 2/2-way valve for a gaseous cleaning fluid, in particular compressed air, or can be configured as a hydraulic 2/2-way valve for a liquid cleaning fluid, in particular cleaning liquid. In developments, the 2/2-way valve can also be configured as a relay valve, in particular a pneumatic or hydraulic relay valve.

Within the scope of an advantageous development, it is provided that the cleaning fluid, in particular the second cleaning fluid, is cleaning liquid and in particular the fluidic pressure cylinder is a hydraulic pressure cylinder. The second fluid supply unit is advantageously formed as a 2/2-way valve, advantageously as a 2/2-way solenoid valve. In other preferred developments, the second fluid supply unit is formed as a pump, advantageously as an electric pump.

Within the scope of an advantageous development, it is provided that the actuator is configured as a fluidic pressure cylinder, in particular a pneumatic pressure cylinder, having a pressure input for receiving an actuating pressure for generating the cleaning movement. Via such a fluidic pressure cylinder, the cleaning movement can advantageously be generated via a pressurized cleaning fluid which is already present and which is received at the pressure input. In this manner, a separate drive for generating the cleaning movement can advantageously be saved. Via the switching unit, the fluidic pressure cylinder can advantageously be activated independently of the provision of the cleaning fluid to the cleaning nozzle.

Within the scope of an advantageous development, it is provided that the switching unit is a 3/2-way valve. The 3/2-way valve can advantageously be configured as a pneumatic 3/2-way valve for switching a gaseous cleaning fluid, in particular compressed air. In developments, the pneumatic 3/2-way valve can advantageously be configured as a relay valve which is switchable via a gaseous medium, that is, is pneumatically switchable. The 3/2-way valve can advantageously be configured as a hydraulic 3/2-way valve. The hydraulic 3/2-way valve can advantageously be configured to switch a liquid cleaning fluid, in particular a cleaning liquid. The 3/2-way valve is advantageously configured as a 3/2-way solenoid valve. In developments, the hydraulic 3/2-way valve can advantageously be configured as a relay valve which is switchable via a liquid, that is, is hydraulically switchable. The 3/2-way valve is advantageously configured to be normally venting, that is, to be in a venting position in a non-activated, in particular non-energized, state. In the case of an actuator configured as a fluidic pressure cylinder, the venting position advantageously allows the pressure input to be vented, in particular in order to bring about the retraction movement of the nozzle shaft.

Within the scope of an advantageous development, it is provided that the actuator has a return spring which deforms against the cleaning movement and is configured to generate a retraction movement. Via a return spring which deforms during the cleaning movement and thus stores energy for generating the retraction movement, a drive for generating the retraction movement can advantageously be spared.

Within the scope of an advantageous development, it is provided that the actuator is configured as a linear drive, wherein the linear drive is configured to generate the cleaning movement, and the switching unit is configured as an electric motor. Advantageously, the linear drive is configured to generate a retraction movement. Via such a mechanically, in particular electromechanically, driven actuator, selective movement to individual nozzle positions can advantageously be implemented. To that end, the actuator can have an electric motor, in particular an indexed motor having a rotary encoder or similar position encoder. The linear drive is advantageously configured as a spindle drive or screw drive or has a suitable gear system for converting a rotary movement provided by an electric motor into a linear movement.

Within the scope of a preferred development there is provided a control unit for controlling the switching unit and/or the at least one fluid supply unit, in particular for carrying out a cleaning method by controlling the switching unit and the fluid supply unit at timed intervals. The control unit is advantageously connected in a signal-carrying manner to at least one, advantageously all, of the fluid supply unit and/or switching unit of the cleaning device. The control unit is advantageously configured as an electronic control unit (ECU).

Within the scope of a preferred development there is provided a termination determining unit which is configured to specify, in dependence on a sensor signal provided by the sensor, a termination nozzle position and/or a termination time. The termination determining unit is in particular configured to detect the presence of one or more dirt particles and, in dependence thereon, to specify a termination nozzle position corresponding to the position of the dirt particles. Via a termination determining unit, time and/or cleaning fluid can advantageously be saved, and nevertheless effective, in particular needs-based, cleaning of a sensor can be made possible.

Within the scope of a preferred development there is provided a target determining unit which is configured to determine one or more target nozzle positions or one or more target nozzle zones. The target determining unit is advantageously configured to detect, on the basis of the camera signal, dirt particles and their position on the surface to be cleaned and, in dependence on the positions of the dirt particles, to provide one or more target nozzle positions or one or more target nozzle zones. In particular, the one or more target nozzle positions or one or more target nozzle zones are provided to the control unit of the cleaning device. Advantageously, the target determining unit can be configured to determine a target cleaning fluid amount, which is applied at a target nozzle position or a target nozzle zone. The target cleaning fluid amount can advantageously be determined in dependence on the soiling, in particular on the size of the dirt particle or the arrangement of dirt particles.

The cleaning liquid F is advantageously formed by water. Advantageously, cleaning additives can be added to the water.

Fluid supply units configured as 2/2-way valves are preferably in the form of normally closed valves, which are preferably in a blocking position in a non-activated, in particular non-energized, state.

In particular, the at least one cleaning nozzle is rigidly connected to the nozzle shaft.

Within the scope of a preferred development, the cleaning device is configured to selectively apply one or more cleaning fluids at one or more individual target nozzle positions. In such a development, individual, local areas of soiling can advantageously be loosened in a manner that saves cleaning fluid. Particularly advantageously, selective application of one or more cleaning fluids at multiple contiguous target nozzle positions, which together form a target nozzle zone, is also possible. Such developments for selective, in particular controllable, application are advantageously made possible by the independent activation of the switching unit and the at least one fluid supply unit in accordance with the concept of the disclosure.

In a further aspect, the disclosure also leads to a vehicle, in particular a commercial vehicle or a passenger car, having a cleaning device according to the first aspect of the disclosure. In the vehicle according to the second aspect of the disclosure, the advantages of the cleaning device according to the first aspect of the disclosure are advantageously used.

In an advantageous development of the method, that is, of the cleaning method, a cleaning liquid is applied to the surface to be cleaned during the cleaning movement, in particular throughout the entire cleaning movement, and compressed air is applied to the surface to be cleaned during the retraction movement, in particular throughout the entire retraction movement. In an advantageous development of the method, a waiting step is provided between the cleaning movement and the retraction movement, or between a retraction movement and a cleaning movement.

In an advantageous development of the method, application to the surface to be cleaned takes place at least at one target nozzle position and/or at least one target nozzle zone.

In an advantageous development of the method there is applied a target cleaning fluid amount, which is determined in particular in dependence on one or more detected dirt particles on the surface to be cleaned. Where the detected dirt particles are relatively large, a relatively large target cleaning fluid amount is correspondingly chosen.

In an advantageous development of the method, premature ending of the cleaning movement is provided in dependence on a termination nozzle position and/or a termination time. This in particular involves ending the cleaning movement before the end position is reached if a termination nozzle position and/or a termination time is prescribed. The termination nozzle position and/or the termination time is advantageously determined in dependence on a sensor signal of the sensor.

It will be appreciated that the cleaning device according to the first aspect of the disclosure, the vehicle according to the second aspect of the disclosure and the method according to the third aspect of the disclosure have identical and similar sub-aspects. In this respect, for the development of one aspect of the disclosure, reference is also made to the developments of the other aspects of the disclosure.

BRIEF DESCRIPTION OF DRAWINGS

The invention will now be described with reference to the drawings wherein.

DETAILED DESCRIPTION

Figure 1A:
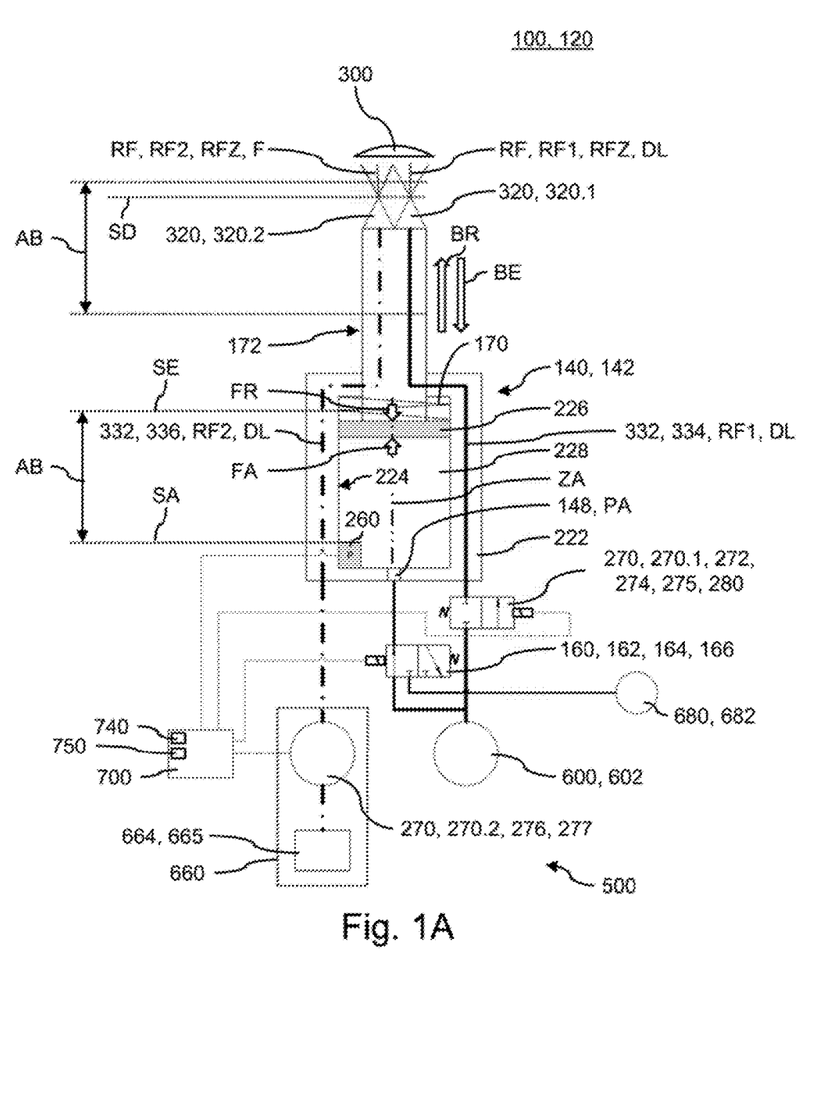
FIG. 1A, FIG. 1B, FIG. 1C show a first embodiment of a cleaning device in accordance with the concept of the disclosure.
Figure 1B:
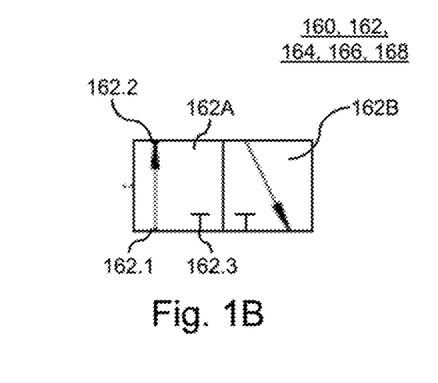
Figure 1C:
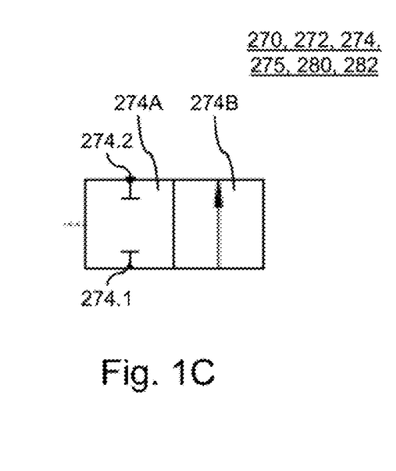

FIGS. 1A to 1C show a first embodiment of a cleaning device 100 in accordance with the concept of the disclosure. The cleaning device 100 has an actuator 140 configured as a fluidic pressure cylinder 142 for generating a cleaning movement BR. The fluidic pressure cylinder 142 has a pressure input 148 for receiving an actuating pressure PA.

The fluidic pressure cylinder 142 has a cylinder housing 222 having a cylinder interior 228, wherein the cylinder interior 228 is advantageously configured to be cylindrical along a cylinder axis ZA. In the cylinder interior 228, a plunger 226 is accommodated so as to be movable in translation along the cylinder axis ZA. The diameter of the plunger 226 corresponds to the inside diameter of the cylinder interior 228, so that the plunger 226 is in pressure-tight contact with an inside wall 224 of the cylinder interior 228. The plunger 226 can optionally have a sealing ring arranged on its lateral surface for better sealing with respect to the inside wall 224.

In the present case, the cleaning device 100 has a switching unit 160 which is configured as a 3/2-way valve 162, here specifically as a 3/2-way solenoid valve 164. The 3/2-way valve 162 is configured to admit air into the pressure input 148 in a controllable manner in order to provide the actuating pressure PA.

In the embodiment shown in FIG. 1A, the 3/2-way valve 162 is configured as a pneumatic 3/2-way valve 166. The 3/2-way valve 162 has, as shown in FIG. 1B, a first port 162.1 which is pneumatically connected to a compressed air source 600, in the present case a compressor 602. The 3/2-way valve 162 has a second port 162.2 which is pneumatically connected to the pressure input 148. The 3/2-way valve 162 has a third port 162.3 which is pneumatically connected to a vent 680, in particular leading into an environment 682. In an air admission position 162A of the 3/2-way valve 162, the first port 162.1 is pneumatically connected to the second port 162.2. In a venting position 162B of the 3/2-way valve 162, the second port 162.2 is pneumatically connected to the third port 162.3 and in particular the first port 162.1 is blocked. Within the scope of the disclosure, a 3/2-way valve 162 can be configured as a pneumatic 3/2-way valve for a gaseous cleaning fluid RF, in particular compressed air DL, or as a hydraulic 3/2-way valve for a liquid cleaning fluid RF, in particular cleaning liquid F.

When an actuating pressure PA is applied to the pressure input 148, in particular when the 3/2-way valve 162 is in the air admission position 162A, an actuating force FA acting on the plunger 226 results. Owing to the axial movability of the plunger 226, an axial movement of the plunger 226 in the form of a cleaning movement BR results, as far as an end position SE. The cleaning device 100 further has a return spring 170 which is fastened to the plunger 226 and deforms when the plunger 226 moves out of its starting position SA. The deformation of the return spring 170 results in a return force FR which acts on the plunger 226 and is directed contrary to the actuating force FA.

The cleaning device 100 has a first cleaning nozzle 320.1 and a second cleaning nozzle 320.2, both of which are fastened to a nozzle shaft 172. The nozzle shaft 172 is fixedly connected to the plunger 226, with the result that the cleaning movement BR generated by the plunger 226 is transmitted to the cleaning nozzle 320, here the first cleaning nozzle 320.1 and the second cleaning nozzle 320.2. In all embodiments, the cleaning device 100 can also have instead of individual cleaning nozzles 320.1, 320.2 a common cleaning nozzle 320 for multiple cleaning fluids RF, in particular for compressed air DL and cleaning liquid F, in particular in the form of a combination nozzle having a nozzle body which in each case has a nozzle opening for a cleaning fluid RF.

When the pressure input 148 is vented, in particular when the 3/2-way valve 162 is in the venting position 162B, a return force FR no longer acts on the plunger 226 and the plunger 226, together with the nozzle shaft 172 and the cleaning nozzle 320.1, 320.2, is moved by the return force FR in a retraction movement BE back into its starting position SA. The actuator 140 is thus configured to cover an actuating stroke AB between the starting position SA and the end position SE.

The cleaning device 100 has a first fluid supply unit 270.1 in the form of a fluid valve 272 for a first cleaning fluid RF1 in the form of compressed air DL. The cleaning device 100 has a second fluid supply unit 270.2 in the form of a pump 276 for a second cleaning fluid RF2 in the form of cleaning liquid F.

The first fluid supply unit 270.1 is connected in a fluid-carrying manner to the first cleaning nozzle 320.1 by way of a first fluid line 332 in the form of a compressed air fluid line 334. The second fluid supply unit 270.2 is connected in a fluid-carrying manner to the second cleaning nozzle 320.2 by way of a second fluid line 332 in the form of a liquid fluid line 336. The fluid lines 332, in particular the compressed air fluid line 334 and the liquid fluid line 336, can advantageously, as shown here, be configured as channels or bores in the cleaning device 100, in particular in the cylinder housing 222 and the nozzle shaft 172. In other advantageous embodiments, the fluid lines 332 are configured as hoses, pipes or similar line bodies. Mixed forms in the case of a fluid line are also possible, for example a line body, in particular a hose, which leads from the fluid supply unit to the nozzle shaft and which adjoins a bore running in the nozzle shaft to the cleaning nozzle. Via such a partial portion of the fluid line, which is configured to be flexible, a movement of the nozzle shaft relative to the remaining part of the cleaning device can advantageously be made possible.

The first fluid supply unit 270.1 is configured as a fluid valve 272 in the form of a 2/2-way valve 274. The 2/2-way valve 274 is preferably, as shown here, configured as a 2/2-way solenoid valve 275. The 2/2-way valve 274 has, as shown in FIG. 1C, a first port 274.1 which is pneumatically connected to the compressed air source 600, here the compressor 602. The 2/2-way valve 274 has a second port 274.2 which is pneumatically connected to the cleaning nozzle 320, here the first cleaning nozzle 320.1. In a first blocking position 274A, a pneumatic connection between the first port 274.1 and the second port 274.2 is interrupted. In a second open position 274B, the first port 274.1 is pneumatically connected to the second port 274.2. Within the scope of the disclosure, a 2/2-way valve 274 can be configured as a pneumatic 2/2-way valve 280 for a gaseous cleaning fluid RF, in particular compressed air DL, or can be configured as a hydraulic 2/2-way valve 282 for a liquid cleaning fluid RF, in particular cleaning liquid F.

The second fluid supply unit 270.2, namely the pump 276, is advantageously, as here, in the form of an electric pump 277 and is connected in a fluid-carrying manner to a liquid source 660 in the form of a liquid tank 664. The liquid tank 664, as shown here, is formed in particular by a washing water tank 665.

In this respect, FIG. 1A shows, overall, a cleaning and sensor system 120 for a vehicle 1000, which system has a sensor 300 and a cleaning device 100 in accordance with the concept of the disclosure. The cleaning and sensor system 120 additionally has a supply device 500. The supply device 500, as explained, can have a compressed air source 600 and/or a liquid tank 664.

The cleaning and sensor system 120 additionally has a control unit 700 which is configured to control the cleaning device 100, as is explained hereinbelow. The cleaning device 100 accordingly has an electrical control unit 700 which is configured to control the cleaning device 100 and for that purpose is connected in a signal-carrying manner to the key controllable components. In the present case, the control unit 700 is connected in a signal-carrying manner to the switching unit 160 in the form of the 3/2-way valve 162, to the first fluid supply unit 270.1 in the form of the 2/2-way valve 274 and to the second fluid supply unit 270.2 in the form of the pump 276.

The cleaning device 100, in particular the fluidic pressure cylinder 142, can advantageously, as shown here, have a pressure sensor 260 which is connected in a fluid-carrying manner to the cylinder interior 228 or is arranged therein. Via a pressure sensor 260, the pressure prevailing in the cylinder interior 228, in particular the actuating pressure PA, can advantageously be determined. Via the pressure sensor 260, the function of the fluidic pressure cylinder 142 and/or of the switching unit 160 can advantageously be made plausible. Via the pressure sensor 260, a nozzle position SD can advantageously be determined on the basis of the determined actuating pressure PA, in particular on the basis of an allocation, determined beforehand by measurement, of actuating pressures PA to a respective nozzle position SD.

Figure 2:
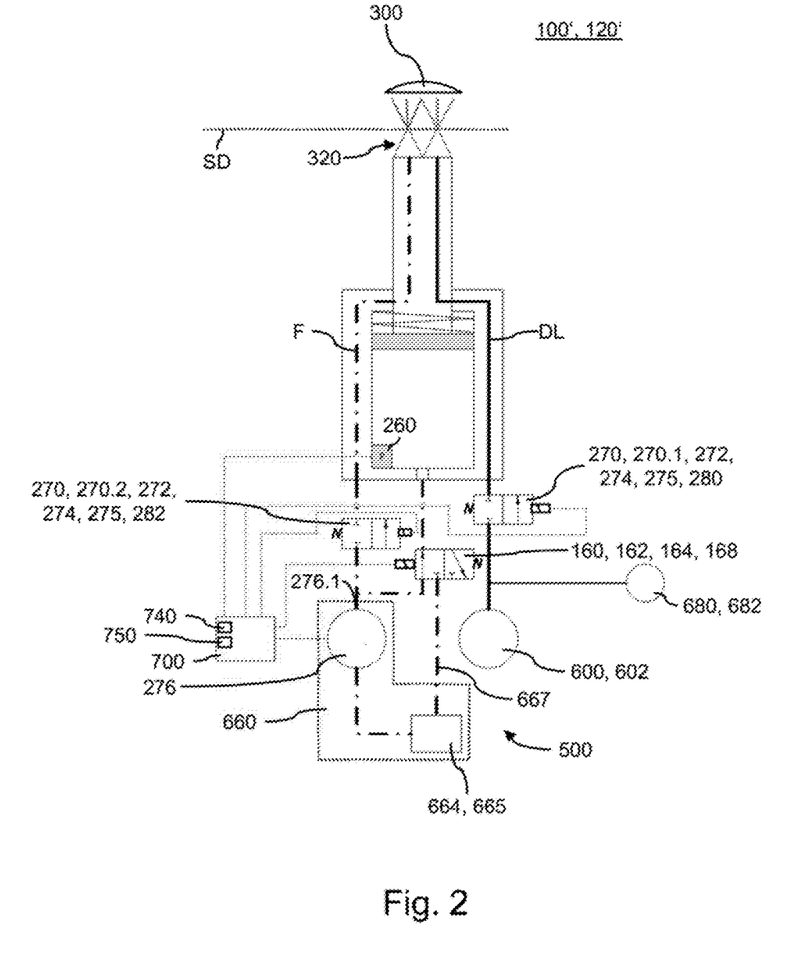
FIG. 2 shows a second embodiment of a further cleaning device in accordance with the concept of the disclosure.

FIG. 2 shows a second embodiment of a further cleaning device 100' of a further sensor and cleaning system 120', in which, in contrast to the cleaning device 100 shown in FIG. 1A, the pump 276 is used to generate the actuating pressure PA at the pressure input 148 of the fluidic pressure cylinder 142. To that end, a pump outlet 276.1 is connected in a fluid-carrying manner to the first port 162.1 of the switching unit 160 configured as a 3/2-way valve 162.

The first fluid supply unit 270.1 for selectively providing compressed air DL is configured, analogously to the cleaning device 100 shown in FIG. 1A, as a fluid valve 272, namely as a 2/2-way valve 274 in the form of a 2/2-way solenoid valve 275.

Furthermore, the further cleaning device 100' has a second fluid supply unit 270.2 in the form of a fluid valve 272, namely of a 2/2-way valve 274 in the form of a 2/2-way solenoid valve 275, which, as shown here, is preferably configured as a normally closed valve. In contrast to the cleaning device 100 shown in FIGS. 1A to 1C, a separate fluid valve 272 is thus used as a second fluid supply unit 270.2, in particular because the pump 276 is likewise used for supplying the switching unit 160, that is, for generating the actuating pressure PA. With the second fluid supply unit 270.2, the cleaning liquid can selectively be provided at the cleaning nozzle 320, in the present case in that a fluid-carrying connection between the pump outlet 276.1 and the cleaning nozzle 320 can selectively be opened and blocked by the 2/2-way valve 274.

In the further cleaning device 100', the switching unit 160 configured as a 3/2-way valve 162 is a hydraulic 3/2-way valve 168, since it is used for switching the cleaning liquid F. As a particular feature, the third port 162.3 in this embodiment is connected to the liquid tank 664 by way of a return line 667 in order to allow the cleaning liquid F to flow back from the cylinder interior 228 into the liquid tank 664 in the venting position 162B of the 3/2-way valve 162.

Figure 3:
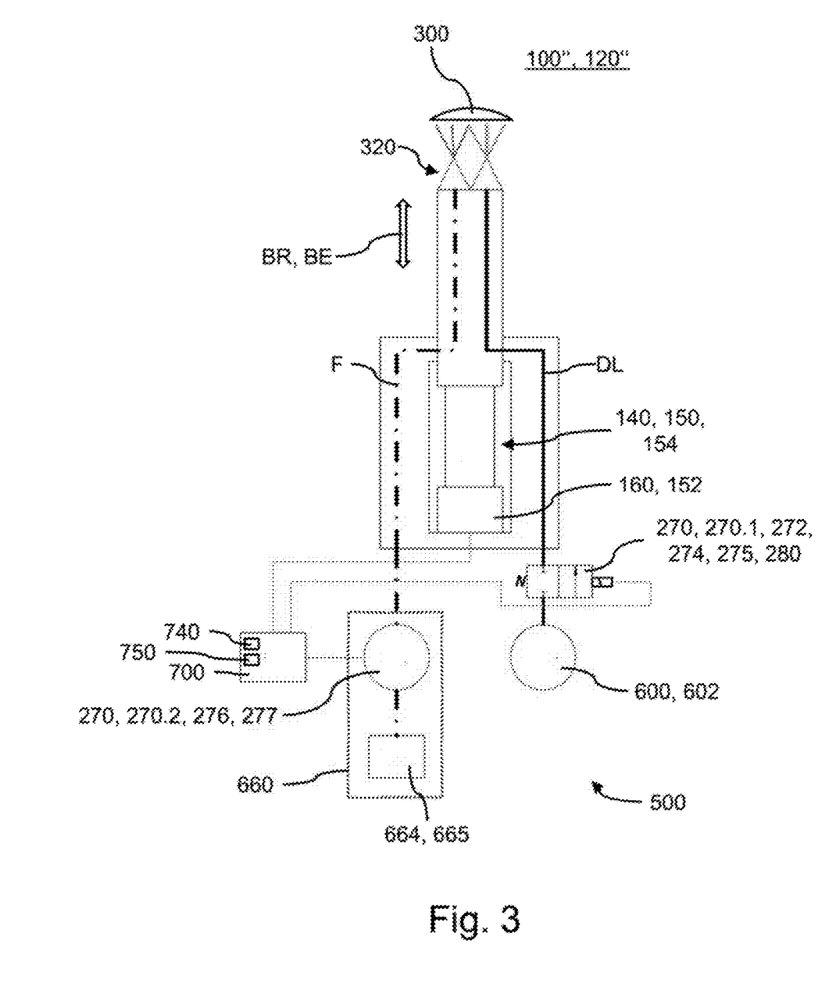
FIG. 3 shows a third embodiment of yet a further cleaning device in accordance with the concept of the disclosure.

FIG. 3 shows a third embodiment of yet a further cleaning device 100" of yet a further sensor and cleaning system 120", which cleaning device differs from the cleaning device 100 shown in FIG. 1A in particular in that the actuator 140 is configured as a linear drive 150 which is driven by a switching unit 160 configured as an electric motor 152. The linear drive 150 is preferably formed as a spindle drive 154. Via an actuator configured as a linear drive 150, individual nozzle positions SD can advantageously selectively be moved to and maintained. Thus, individual movement profiles of the cleaning nozzle 320 can advantageously be achieved.

Figure 4A:
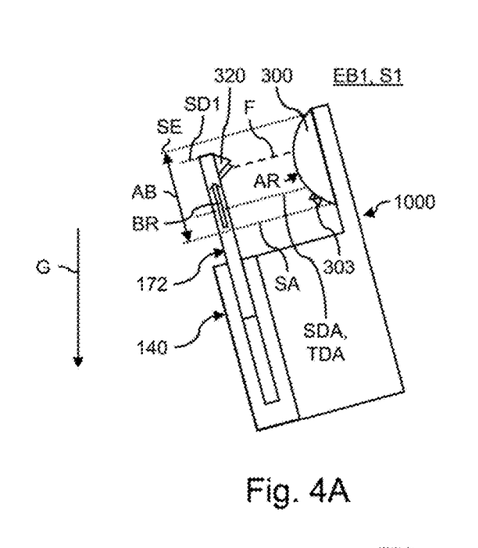
FIG. 4A, FIG. 4B show, schematically, a possible first installation position of a cleaning device.
Figure 4B:
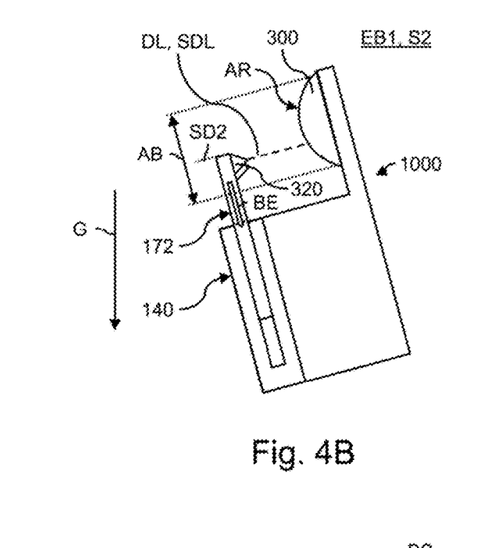

FIG. 4A and FIG. 4B show, schematically, a possible first installation position EB1 of a cleaning device 100, 100', 100" in accordance with the concept of the disclosure. An installation position EB1, EB2 describes in particular the arrangement of the cleaning device 100, 100', 100" relative to the sensor 300 and relative to the direction of gravity G. In order to illustrate a preferred cleaning method 400, FIG. 4A shows by way of example a state during a first step S1 and FIG. 4B shows a state during a second step S2. Advantageously, the first installation position EB1 is such that the cleaning movement BR is directed contrary to or approximately contrary to the direction of gravity G (for example, as shown here, with an inclination of a few degrees relative to the direction of gravity G). In an embodiment of a cleaning method 400 additionally shown in FIG. 6A, in a first step S1 the cleaning movement BR is generated by the activation of the switching unit 160 (not shown here), and during the cleaning movement BR cleaning liquid F is advantageously applied to a surface to be cleaned AR of a sensor 300 by activation of a fluid supply unit 270, in particular the second fluid supply unit 270.2. In FIG. 4A, the nozzle shaft 172 is shown in a first nozzle position SD1 shortly before the end position SE is reached. When the end position SE is reached, application of cleaning liquid F is advantageously stopped by corresponding activation of the fluid supply unit 270, in particular of the second fluid supply unit 270.2.

The duration of the first step S1 is advantageously given by the duration of the cleaning movement BR, in particular by the deployment of the nozzle shaft 172 from the starting position SA to the end position SE. The duration of the cleaning movement BR is dependent on the deployment speed of the piston, which in turn is dependent in particular on the actuating pressure PA. The duration of the cleaning movement BR can be several seconds, for example 3 seconds.

In a subsequent second step S2, a retraction movement BE is generated by corresponding activation of the switching unit 160, in particular by venting of the 3/2-way valve 162, and during the retraction movement BE compressed air DL is advantageously applied to the surface to be cleaned AR by activation of a fluid supply unit 270, in particular of the first fluid supply unit 270.1 in the form of the 2/2-way valve 274. When the starting position SA is reached, the application of compressed air DL is advantageously stopped by corresponding activation of the fluid supply unit 270, in particular of the first fluid supply unit 270.1. By simultaneously carrying out the retraction movement BE and the application of compressed air DL, it is advantageously achieved with the arrangement that is shown of the cleaning device 100 that the cleaning liquid F previously applied to the surface to be cleaned AR is removed from the surface to be cleaned AR by the compressed air DL together with gravity G. This means that a cleaning fluid jet SF in the form of a compressed air jet which is delivered by the cleaning nozzle 320 and strikes the surface to be cleaned AR moves in the direction of gravity G and pushes or blows the cleaning liquid F on the surface to be cleaned AR, advantageously together with dirt particles 303 softened by the cleaning liquid F, from the surface to be cleaned AR. The duration of the second step S2 is advantageously dependent on the duration of the retraction movement BE, which in turn is dependent in particular on the return spring 170. The duration of the retraction movement BE can be several seconds, for example 3 seconds.

A waiting step SW can advantageously be provided between the first step S1 and the second step S2, in order advantageously to allow a longer duration of action of the cleaning liquid F, in particular softening of dirt particles on the surface to be cleaned AR.

In an advantageous, optional modification of the first step S1, the cleaning movement BR does not take place as far as the end position SE but is ended prematurely in a termination step SAE at a termination nozzle position SDA and/or at a termination time TDA. A termination nozzle position SDA can take place, and in particular be specified, in particular in dependence on an evaluation of a sensor signal 306, if the presence of one or more dirt particles 303 on the surface to be cleaned AR has been determined and their position corresponds to a particular nozzle position SD. This nozzle position SD is defined as the termination nozzle position SDA, since movement of the cleaning nozzle to this nozzle position is sufficient to remove the dirt particles 303.

Purposive movement to the termination nozzle position SDA can take place in different ways. Advantageously, control can take place via a pressure sensor 260, wherein a measured pressure value of an actuating pressure PA corresponds to a nozzle position SD and, by way of this relationship, a termination nozzle position SDA as a desired value can be converted into a pressure desired value. When the pressure desired value is reached, the cleaning movement BR is ended prematurely by activation of the switching unit 160.

In the case of an actuator 140 configured as a linear drive 150 and/or a switching unit 160 configured as an electric motor 152, movement to the termination nozzle position SDA can advantageously be controlled by way of a motor controller of the electric motor 152.

Alternatively or in addition, the required nozzle position SD for reaching the termination nozzle position SDA can advantageously be estimated by way of the known movement speed of the nozzle shaft 172 and thus the deployment time. The termination nozzle position SDA is here converted into a time desired value, the cleaning movement BR being ended prematurely by activation of the switching unit 160 when the time desired value has elapsed.

In embodiments, the cleaning movement BR can be ended prematurely at a termination time TDA. In particular when the cleaning device 100 is configured to detect the presence of dirt particles 303 on the surface to be cleaned AR in real time or with a sufficiently short delay, the cleaning movement BR can be ended prematurely by activation of the switching unit 160 at the time when the removal of the previously detected dirt particles 303 has been determined by the evaluation of the sensor signal 306.

Premature ending of the cleaning movement BR takes place in particular by corresponding activation of the switching unit 160, which results in premature initiation of the retraction movement BE. Where multiple dirt particles 303 or groups of dirt particles 303 are present, a termination nozzle position SDA is specified, at which all the dirt particles 303 are covered in a cleaning movement BR—which is to be terminated prematurely. In this case, the termination nozzle position SDA thus corresponds to the outermost dirt particle 303 in the direction of the cleaning movement BR.

Detection of the presence of dirt particles 303—and in particular the determination of a termination nozzle position SDA corresponding to the position of the dirt particles 303—can advantageously take place in a termination determining unit 740. The termination determining unit 740 is advantageously arranged in the control unit 700 or in a vehicle control unit 1020. Via such dirt-dependent cleaning by deployment only as far as a termination nozzle position SDA, time and cleaning liquid F can advantageously be saved.

Advantageously, a cleaning device 100, in particular a control unit 700, can have a target determining unit 750 for detecting the presence of dirt particles 303 and for providing at least one target nozzle position SDZ and/or at least one target nozzle zone SZZ. On the basis of a target nozzle position SDZ and/or a target nozzle zone SZZ, the cleaning nozzle 320 can advantageously be moved in a way that saves cleaning fluid RF to individual regions of the surface to be cleaned AR that have dirt particles 303.

Such determination of a termination nozzle position SDA and premature ending of the cleaning movement BR can optionally take place in an analogous manner in the further first step S1' and the further third step S3' of the further cleaning method 400'.

Via the independent activation of the switching unit and the at least one fluid supply unit, other types of methods can, however, advantageously be implemented in a flexible manner with a cleaning device 100 in accordance with the concept of the disclosure.

Figure 4C:
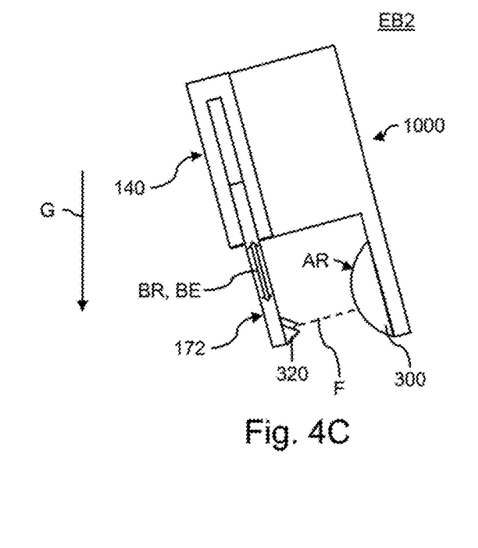
FIG. 4C shows a further advantageous second installation position.

FIG. 4C shows a further advantageous second installation position EB2 which, in contrast to the installation position EB1 shown in FIG. 4A and FIG. 4B, is inverted in the vertical direction, such that the cleaning movement BR takes place with or approximately with the direction of gravity G. Correspondingly, the opposite retraction movement BE takes place contrary to or approximately contrary to gravity G. With such a second installation position EB2, a further cleaning method 400' which will be explained in detail in connection with FIG. 6B can advantageously be carried out.

Figure 5A:
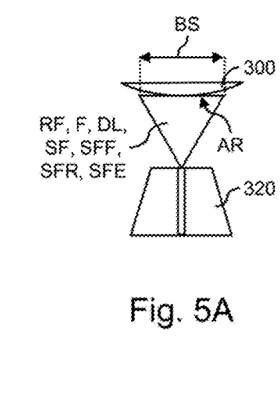
FIG. 5A, FIG. 5B show, schematically, an advantageous cleaning nozzle.

FIG. 5A shows, schematically, an advantageous cleaning nozzle 320, which in the present case is configured to generate a cleaning fluid jet SF in the form of a flat jet SFF. A cleaning fluid jet SF can in particular include both compressed air and cleaning fluid, as well as a mixture of the two or of other cleaning fluids, for example in the form of a spray mist.

Figure 5B:
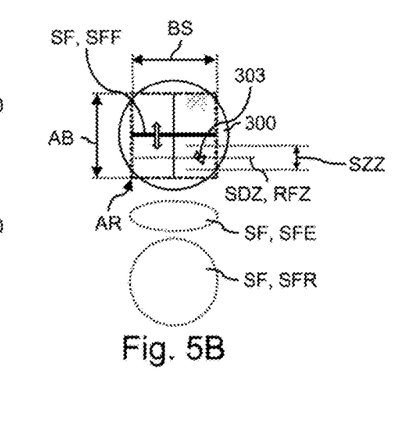

Within the scope of the disclosure, cleaning nozzles 320 for generating cleaning fluid jets SF of other shapes are also possible, for example a cleaning nozzle 320 for generating a round jet SFR or an elliptical jet SFE. A flat jet SFF has a flat shape which widens—starting from the cleaning nozzle 320—and which strikes the surface to be cleaned AR of the sensor 300 substantially linearly with a jet width BS. This can be seen in particular in the plan view, shown in FIG. 5B, of the surface of the sensor 300. The cleaning movement BR with the actuating stroke AB which can be generated by the actuator 140 advantageously allows the cleaning fluid jet SF, which is shown as a flat jet SFF in FIG. 5B, to be moved over the surface of the sensor 300. The surface to be cleaned AR is thus defined by the jet width BS and the actuating stroke AB advantageously running perpendicular thereto. In the case of a linear flat jet SFF, an approximately rectangular surface to be cleaned AR results. In FIG. 5B, the shapes of optional other cleaning fluid jets SF are further shown by broken lines, namely the shape of a round jet SFR and of an elliptical jet SFE, which can be moved in an analogous manner over the surface of the sensor 300 in a cleaning movement BR via a corresponding cleaning nozzle 320.

In particular, as a result of the independent activation of the switching unit and the at least one fluid supply unit, embodiments are possible in which one or more cleaning fluids can selectively be applied at one or more individual target nozzle positions SDZ, advantageously in order to loosen individual, local dirt particles 303. Particularly advantageously, the selective application of one or more cleaning fluids at multiple, contiguous target nozzle positions SDZ, which together form a target nozzle zone SZZ, is also possible. FIG. 5B shows by way of example a target nozzle position SDZ which is located at a local accumulation of dirt particles 303. A target nozzle zone SZZ which surrounds the dirt particles 303 is further shown there. Advantageously, one or more target nozzle positions SDZ or one or more target nozzle zones SZZ can be determined via a target determining unit 750, which is configured to detect dirt particles 303 and their position on the surface to be cleaned AR on the basis of the sensor signal 306 and, in dependence on the positions of the dirt particles 303, to provide one or more target nozzle positions SDZ or one or more target nozzle zones SZZ.

Via the selective activation of at least one target nozzle position SDZ or at least one target nozzle zone SZZ, cleaning can advantageously be carried out in multiple pulses over the deployment distance, in particular if soiling or dirt particles are not present all over.

Advantageously, the target determining unit 750 can be configured to determine a target cleaning fluid amount RFZ, which is applied at a target nozzle position SDZ or a target nozzle zone SZZ. The target cleaning fluid amount RFZ can advantageously be determined in dependence on the soiling, in particular the size of the dirt particle 303 or the arrangement of dirt particles 303.

For example, during the cleaning movement BR, a first target fluid amount RFZ of 1 ml can be applied after a deployment distance of 1 cm at a first target nozzle position SDZ, and a second target fluid amount RFZ of 2 ml of cleaning liquid can be applied after a deployment distance of 4 cm at a second target nozzle position SDZ during the retraction movement the air cleaning can correspondingly be carried out at both target nozzle positions SDZ. The target nozzle position SDZ and the target cleaning fluid amount RFZ can freely be determined individually according to the detected soiling.

Figure 6A:
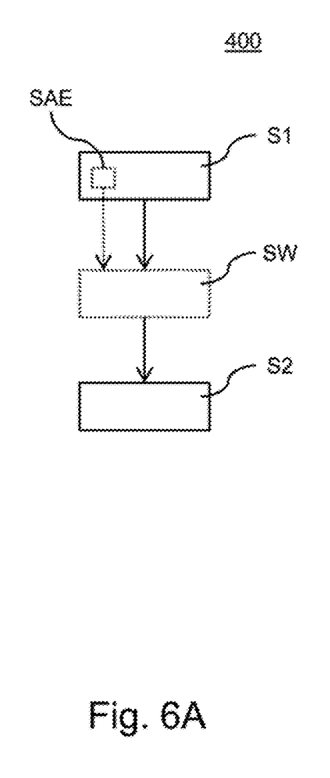
FIG. 6A shows an embodiment of a cleaning method.
Figure 6B:
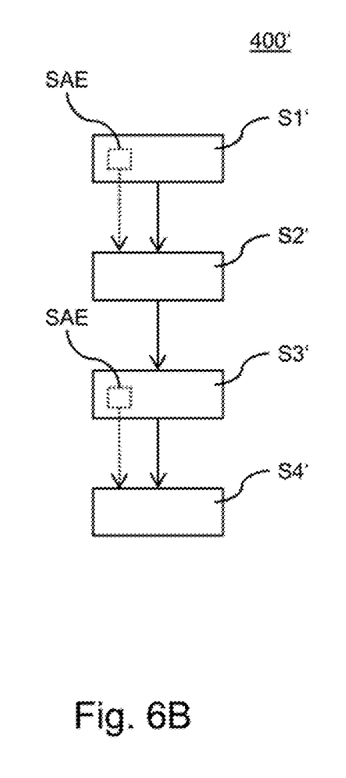
FIG. 6B shows a further embodiment of a further cleaning method.

FIG. 6A shows an embodiment of a preferred cleaning method 400 as already described above.

FIG. 6B shows a further embodiment of a preferred further cleaning method 400'. In a further first step S1', the cleaning nozzle 320 is deployed in a cleaning movement BR, in particular by activation of the switching unit 160, and at the same time a cleaning liquid F is applied to the surface to be cleaned AR, in particular by activation of the second fluid supply unit 270.2. When the end position SE is reached, in particular the application of the cleaning liquid F is stopped.

In a further second step S2', the cleaning nozzle 320 is retracted in a retraction movement BE, in particular by activation of the switching unit 160, advantageously without application of a cleaning fluid RF taking place.

In a further third step S3', the cleaning nozzle 320 is again deployed in a cleaning movement BR, in particular by activation of the switching unit 160, and at the same time compressed air DL is applied to the surface to be cleaned AR, in particular by activation of the first fluid supply unit 270.1.

In a further fourth step S4', the cleaning nozzle 320 is again retracted in a retraction movement BE, in particular by activation of the switching unit 160. When the end position SE is reached, in particular the application of compressed air DL is stopped.

In the further cleaning method 400', a waiting step SW can likewise be provided at one or more points between steps S1' to S4'.

Figure 7:
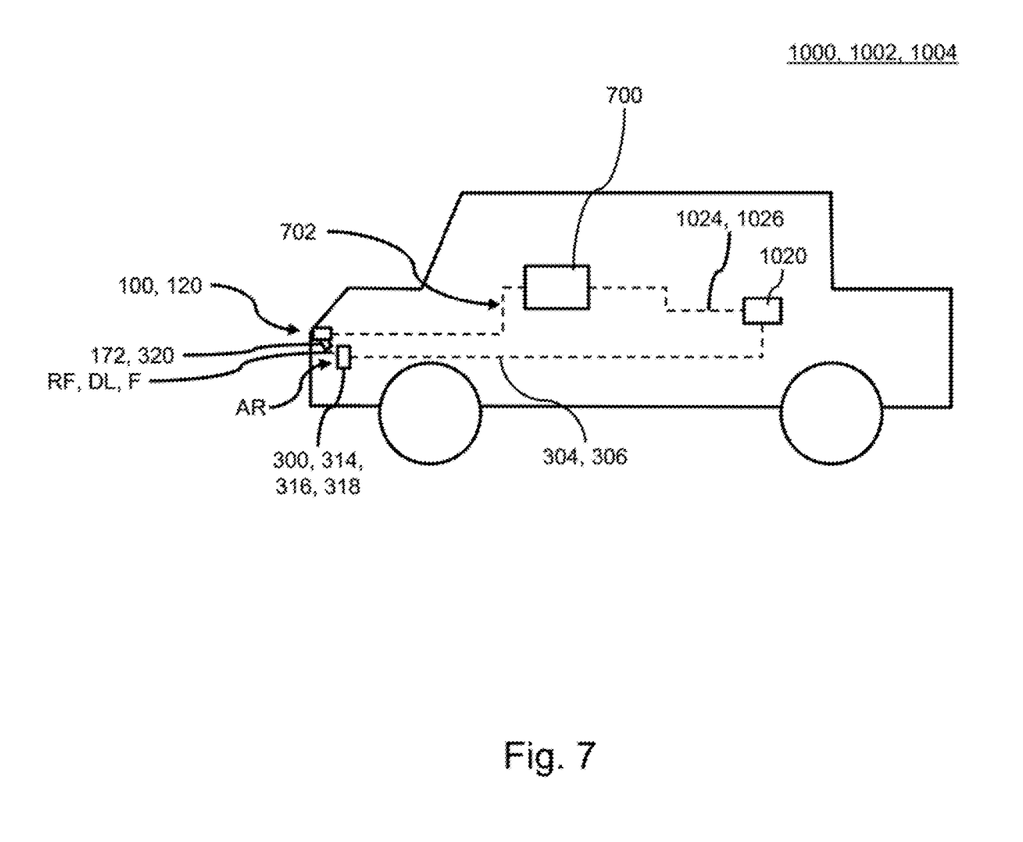
FIG. 7 shows a vehicle having a cleaning device in accordance with the concept of the disclosure.

FIG. 7 shows a vehicle 1000, in the present case a passenger car 1002, having a cleaning device 100 in accordance with the concept of the disclosure. In other embodiments, the vehicle 1000 can be in the form of a commercial vehicle 1004. The vehicle 1000 has in the front region a sensor 300, for example a camera 314, in the vicinity of which there is arranged a cleaning device 100 in accordance with the concept of the disclosure having a cleaning nozzle 320 which is movable by an actuator 140. Via the cleaning device 100, a surface to be cleaned AR of the sensor 300 can be cleaned. The cleaning device 100 further has an electrical control unit 700 or is associated with such an electrical control unit. The electrical control unit 700 is configured to activate the cleaning device 100, in particular to activate the switching unit 160 and the at least one fluid supply unit 270, and to that end is connected in a signal-carrying manner to the cleaning device 100 via at least one control line 702.

The vehicle 1000 further has a vehicle control unit 1020 for providing key vehicle functions. The vehicle control unit 1020 is advantageously connected in a signal-carrying manner to the control unit 700 of the cleaning device 100 by way of a vehicle control line 1024. In this manner, the cleaning device 100 can advantageously be controlled by the vehicle control unit 1020, for example in that a cleaning method 400, 400' is invoked. The vehicle control line 1024 can advantageously be configured as a vehicle bus line 1026, for example as a CAN bus. The sensor 300 is advantageously connected in a signal-carrying manner to the vehicle control unit 1020 by way of a sensor line 304 in order to transmit a sensor signal 306.

The sensor 300 can in particular be in the form of a camera 314, LIDAR sensor 316, ultrasonic sensor 318 or similar sensor.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

100, 100', 100" cleaning device
120, 120', 120" sensor and cleaning system
140 actuator
142 pressure cylinder
148 pressure input
150 linear drive
152 motor
154 spindle drive
160 switching unit
162 3/2-way valve
162.1 first port of the 3/2-way valve
162.2 port of the 3/2-way valve
162.3 port of the 3/2-way valve
162A air admission position of the 3/2-way valve
162B venting position of the 3/2-way valve
164 3/2-way solenoid valve
166 pneumatic 3/2-way valve
168 hydraulic 3/2-way valve
170 return spring
172 nozzle shaft
222 cylinder housing
224 inside wall
226 plunger
228 cylinder interior
260 pressure sensor
270 fluid supply unit
270.1 first fluid supply unit
270.2 second fluid supply unit
272 fluid valve
274 2/2-way valve
274.1 first port of the 2/2-way valve
274.2 second port of the 2/2-way valve
274A blocked position of the 2/2-way valve
274B open position of the 2/2-way valve
275 2/2-way solenoid valve
276 pump
276.1 pump outlet
277 electric pump
280 pneumatic 2/2-way solenoid valve
282 hydraulic 2/2-way solenoid valve
300 sensor
303 dirt particle
304 sensor line
306 sensor signal
314 camera
316 LIDAR sensor
318 ultrasonic sensor
320 cleaning nozzle
320.1 first cleaning nozzle
320.2 second cleaning nozzle
332 fluid line
334 compressed air fluid line
336 liquid fluid line
400 cleaning method
400' further cleaning method 500 supply device
600 compressed air source
602 compressor
660 liquid source
664 liquid tank
665 washing water tank
667 return line
680 vent
682 environment
700 controller/control unit
702 control line
740 termination determining unit
750 target determining unit
1000 vehicle
1002 passenger car
1004 commercial vehicle
1020 vehicle control unit
1024 vehicle control line
1026 vehicle bus line
AB actuating stroke
AR surface to be cleaned
BE retraction movement
BR cleaning movement
BS jet width
DL compressed air
EB installation position
EB1, EB2 first, second installation position
F cleaning liquid
FA actuating force
FR return force
G gravity
S1, S2 first, second step
S1', S2', S3', S4' first to fourth further step
SW waiting step
SA starting position
SD nozzle position
SDA termination nozzle position
SDZ target nozzle position
SE end position
SF cleaning fluid jet
SFE elliptical jet
SFF flat jet
SFR round jet
SZZ target nozzle zone
TDA termination time
RF cleaning fluid
RF1, RF2 first, second cleaning fluid
RFZ target cleaning fluid amount
ZA cylinder axis

The invention claimed is:

1. A cleaning device for a sensor, the cleaning device comprising:
a cleaning nozzle configured to apply a cleaning fluid to a surface to be cleaned of the sensor;
a fluid supply unit configured to selectively provide the cleaning fluid to said cleaning nozzle;
an actuator configured to generate a cleaning movement of said cleaning nozzle; and,
a switching unit configured to control said actuator such that the cleaning movement can be generated independently of said fluid supply unit; and,
wherein said actuator is a fluidic pressure cylinder having a pressure input for receiving an actuating pressure for generating the cleaning movement, wherein the cleaning fluid which is pressurized is configured to be received at said pressure input.

2. The cleaning device of claim 1, wherein said fluid supply unit is a fluid valve or a pump.

3. The cleaning device of claim 1, wherein said fluid supply unit includes a first fluid supply device for a first cleaning fluid and a second fluid supply device for a second cleaning fluid.

4. The cleaning device of claim 1, wherein the cleaning fluid is compressed air; and said fluid supply unit is a 2/2 valve.

5. The cleaning device of claim 1, wherein the cleaning fluid is a cleaning liquid; and, said fluid supply unit is at least one of a pump and a 2/2 valve.

6. The cleaning device of claim 3, wherein the first cleaning fluid is compressed air; the second cleaning fluid is a cleaning liquid; said first fluid supply unit is a 2/2 valve; and, said second fluid supply unit is at least one of a pump and a 2/2 valve.

7. The cleaning device of claim 1, wherein said fluidic pressure cylinder is a pneumatic pressure cylinder.

8. The cleaning device of claim 1, wherein said switching unit is a 3/2-way valve.

9. The cleaning device of claim 1, wherein said actuator has a return spring configured to deform counter to the cleaning movement and is configured to generate a retraction movement.

10. The cleaning device of claim 1 further comprising a controller for controlling said switching unit and said fluid supply unit.

11. The cleaning device of claim 10, wherein said controller is configured to control said switching unit and said fluid supply unit for performing a cleaning method by controlling said switching unit and said fluid supply unit at timed intervals.

12. The cleaning device of claim 1 further comprising a termination determining unit configured to specify at least one of a termination nozzle position and a termination time in dependence on a sensor signal provided by the sensor.

13. A cleaning and sensor system for a vehicle comprising:
a sensor;
a cleaning device having a cleaning nozzle, a fluid supply unit, an actuator, and a switching unit;
said cleaning nozzle being configured to apply a cleaning fluid to a surface to be cleaned of the sensor;
a fluid supply unit configured to selectively provide the cleaning fluid to said cleaning nozzle;
said actuator being configured to generate a cleaning movement of said cleaning nozzle;
said switching unit being configured to control said actuator such that the cleaning movement can be generated independently of said fluid supply unit;
a supply device;
a controller configured to control said cleaning device;
wherein said actuator is a fluidic pressure cylinder having a pressure input for receiving an actuating pressure for generating the cleaning movement, wherein the cleaning fluid which is pressurized is configured to be received at said pressure input.

14. The cleaning and sensor system of claim 13, wherein the supply device has at least one of a compressed air source and a liquid source.

15. The cleaning and sensor system of claim 13, wherein the supply device includes at least one of a compressor and a liquid tank.

16. A vehicle comprising the cleaning device of claim 1.

* * * * *